(12) United States Patent
Baker

(10) Patent No.: US 7,528,877 B2
(45) Date of Patent: May 5, 2009

(54) METHOD AND SYSTEM FOR REDUCING MISMATCH BETWEEN REFERENCE AND INTENSITY PATHS IN ANALOG TO DIGITAL CONVERTERS IN CMOS ACTIVE PIXEL SENSORS

(75) Inventor: R. Jacob Baker, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 545 days.

(21) Appl. No.: 11/432,016

(22) Filed: May 10, 2006

(65) Prior Publication Data

US 2006/0203115 A1 Sep. 14, 2006

Related U.S. Application Data

(63) Continuation of application No. 10/892,875, filed on Jul. 16, 2004.

(51) Int. Cl.
*H04N 5/335* (2006.01)
*H04N 5/235* (2006.01)

(52) U.S. Cl. .................................. 348/308; 348/221.1
(58) Field of Classification Search ................ 348/308, 348/221.1
See application file for complete search history.

(56) References Cited

U.S. PATENT DOCUMENTS

| | | | |
|---|---|---|---|
| 5,703,353 A | 12/1997 | Blalock et al. ............... 250/214 |
| 5,900,625 A | 5/1999 | Baumgartner ........... 250/214 C |
| 6,128,039 A | 10/2000 | Chen et al. .................. 348/294 |
| 6,535,247 B1 | 3/2003 | Kozlowski et al. .......... 348/241 |
| 6,704,050 B1 | 3/2004 | Washkurak et al. ......... 348/294 |
| 6,707,410 B1 | 3/2004 | Bock .......................... 341/155 |
| 6,747,695 B1 | 6/2004 | Afghahi ...................... 348/241 |
| 6,801,258 B1 | 10/2004 | Pain et al. ................... 348/302 |
| 7,242,429 B1 * | 7/2007 | Lee et al. .................... 348/308 |

OTHER PUBLICATIONS

Baker, R. Jacob, "*A Per Column 1-bit ADC for CMOS Image Sensors*", Boise State University: College of Engineering, May 28, 2003, pp. 1-23.

Baker, R. Jacob, et al., "*CMOS Circuit Design, Layout and Simulation*", IEEE Press Series on Microelectronic System, 1998, pp. 17-1 through 17-40.

\* cited by examiner

*Primary Examiner*—Tuan V Ho
*Assistant Examiner*—Selam T Gebriel
(74) *Attorney, Agent, or Firm*—Dorsey & Whitney LLP

(57) ABSTRACT

A circuit for reducing a mismatch between a reference path to which a reference voltage is applied and an intensity path to which an intensity voltage is applied from an active pixel sensor comprises a first and a second pair of switches and a processing circuit. The first pair of switches couple an intensity input node to which the intensity voltage is applied to a first output node and couple a reference input node to which the reference voltage is applied to a second output node during a first operating period. The second pair of switches couple the intensity input node to the second output node and couple the reference input node to the first output node during a second operating period. A polarity reversing circuit is included in the processing circuit for coupling the first and second output nodes to the processing circuit with one polarity during the first operating period and in a reverse polarity during the second operating period.

31 Claims, 3 Drawing Sheets

METHOD AND SYSTEM FOR REDUCING MISMATCH BETWEEN REFERENCE AND INTENSITY PATHS IN ANALOG TO DIGITAL CONVERTERS IN CMOS ACTIVE PIXEL SENSORS

CROSS-REFERENCE TO RELATED APPLICATION

This application is a continuation of pending U.S. patent application Ser. No. 10/892,875, filed Jul. 16, 2004.

TECHNICAL FIELD

The present invention relates generally to CMOS Active Pixel Sensors (APSs), and more specifically to reducing a mismatch between a reference path and an intensity path in an A/D converter in a CMOS APS.

BACKGROUND OF THE INVENTION

In digital and video cameras, CMOS APSs are used to acquire images. An APS is defined as a solid state image sensor that has one or more active transistors within a pixel unit cell. This is in contrast to a passive pixel sensor that uses a simple switch to connect a pixel signal to a column. An APS provides lower noise, improved scalability and higher speed compared to passive pixel sensors.

In an APS, each pixel contains a photosensing means and at least one other active component. When light is incident on a pixel, a charge is created that is converted to a signal, either a voltage or current signal. The signal represents the amount of light incident upon a pixel.

FIG. 1 is a schematic of a portion of a conventional CMOS APS comprising transistors 104, 108, 112 and a photodiode 116. Although circuitry for only a single pixel is shown in FIG. 1, it will be understood that circuitry for a large number of pixels are normally included in an APS array. Light is coupled through a color filter (not shown) to the photodiode 116. Different colored filters are used in an APS array so that signals from different sets of pixels allow a color image to be created. The photodiode 116 changes the light to a charge having a magnitude that is proportional to the intensity of the light. The charge is converted into a voltage and passed to a column line.

Prior to acquiring an image, each pixel in the APS is reset. This is accomplished by driving a reset row line (Reset N) to a voltage, $V_{DDP}$, where $V_{DDP} > V_{DD} + V_{THN}$, and $V_{THN}$ is the threshold voltage of the transistor 104. This causes the transistor 104 to turn on and sets the voltage across the photodiode 116 to $V_{DD}$. The voltage on the column line is called the dark or reference voltage level, $V_R$, of the pixel. Next, the transistor 112 is turned on by driving Row N to $V_{DDP}$ and, with transistor 108 behaving as a source follower, the column line is set to the reference voltage level, $V_R$. The reference voltage $V_R$ is stored at the beginning of a sense.

After the reference voltage $V_R$ is stored, the Reset N line is driven low, thus turning off the transistor 104 to isolate the photodiode 116 from $V_{DD}$. The light striking the reverse biased photodiode 116 then generates electron-hole pairs that cause the voltage across the photodiode 116 to decrease. The voltage from the photodiode 116 is applied to the gate of the transistor 108, which couples the voltage to column line through the transistor 112, which is turned on by the high RowN signal. As a result, the decrease in the voltage across the photodiode 116 is sampled on the column line and this voltage is called an intensity voltage $V_I$.

The time between the Reset N line being driven low and the intensity voltage, $V_I$, corresponding to the intensity of the light striking the photodiode 116 being sampled on the column line is called the aperture time. Note that the dark signal corresponds to a large voltage ($V_{DD} - V_{THN}$) on the column line while a bright signal corresponds to a lower voltage, less than ($V_{DD} - V_{THN}$) on the column line.

FIG. 2 illustrates a conventional sample and hold circuit that can be used to sample and hold a reference voltage $V_R$ and an intensity voltage $V_I$ from an APS. The sample and hold circuit comprises transistors 204, 208 and hold capacitors 212, 216. The transistor 204 and the hold capacitor 212 are connected in series between a column line 220 and ground. Similarly, the transistor 208 and the hold capacitor 216 are connected in series between the column line 220 and ground.

When ResetN and RowN are high, the pixel's reference or dark voltage, $V_R$ is placed on the column line 220. At this time, a sample and hold reference signal, SHR, is driven high, which turns on the transistor 204, thereby placing a sample of $V_R$ on the hold capacitor 212.

Next, ResetN transitions low to allow the photodiode 116 to change light into a corresponding charge. After the aperture time, a sample of the intensity voltage $V_I$ is placed on the column line 220. At this time, the sample and hold intensity signal SHI is driven high, which turns on the transistor 208, thereby placing a sample of $V_I$ on the hold capacitor 216.

Because each pixel in an imaging array will have slightly different characteristics, the differences in the intensity voltage $V_I$ for light having the same intensity can result in speckles in a resulting image. To eliminate this mismatch problem, images are created based on the intensity of the change of light during an aperture time. This is accomplished by subtracting the reference voltage $V_R$ from the actual measured signal or intensity voltage $V_I$ to accurately determine the light intensity applied to the pixel.

FIG. 3 is a schematic of a conventional circuit that uses the differences in $V_R$ and $V_I$ to accurately determine the light intensity applied to the pixel, and to generate a digital output Q by an A/D. As mentioned earlier, $V_R$ and $V_I$ are sampled and held on to capacitors 212 and 216, respectively. $V_R$ is then converted to a current $I_R$ by a voltage to current converter 308. Similarly, $V_I$ is converted to a current $I_I$ by a voltage to current converter 312. The implementation of a voltage to current converter is well understood by those skilled in the art and thus will not be discussed in detail.

The currents $I_R$ and $I_I$ flow through path R and path I, respectively, to a differential circuit 316. The differential circuit generates an output current $I_{OUT}$, where $I_{OUT} = I_R - I_I$. $I_{OUT}$ is representative of the difference between $V_R$ and $V_I$. The differential circuit 316 can be implemented using a current mirror circuit or other circuits well known to those skilled in the art. An A/D converter 320 receives $I_{OUT}$ and generates a digital output Q. Thus, the digital output Q is representative of the difference between $V_R$ and $V_I$.

While the schematic of FIG. 3 eliminates the problem caused by the mismatches in pixel characteristics, the sampling circuit, having two separate paths, i.e., reference path and intensity signal path, is also subject to a mismatch. Each voltage to current converter has a different random offset that creates a mismatch between the two paths, thereby degrading the resulting the image. Also voltage to current converter has a varying transconductance (gm $= I_R/V_R$ or $I_S/V_S$) that degrades the image. The schematic of FIG. 3 does not eliminate the mismatches in the paths.

FIG. 4 illustrates the mismatch between the reference path and the intensity path. In FIG. 4, a 20 mV offset is in series with the intensity path. The offset voltage, that may be positive or negative, simply represents the mismatch in the paths.

Accordingly, there is a need for a system and a method that reduce the mismatch between the reference path and signal path in an APS.

SUMMARY OF THE INVENTION

According to one aspect of the present invention, a circuit for reducing a mismatch between a reference path to which a reference voltage is applied and an intensity path to which an intensity voltage is applied from an active pixel sensor comprises a first and a second pair of switches and a processing circuit. The first pair of switches couple an intensity input node to which the intensity voltage is applied to a first output node and couple a reference input node to which the reference voltage is applied to a second output node during a first operating period. The second pair of switches couple the intensity input node to the second output node and couple the reference input node to the first output node during a second operating period. A polarity reversing circuit is included in the processing circuit for coupling the first and second output nodes to the processing circuit with one polarity during the first operating period and in a reverse polarity during the second operating period. A toggle switch is coupled to the first and second pair of switches and is adapted to receive a select signal and operable responsive to the select signal to enable the first pair of switches during the first operating period and to enable the second pair of switches during the second operating period.

DETAILED DESCRIPTION OF THE INVENTION

Figure 1:
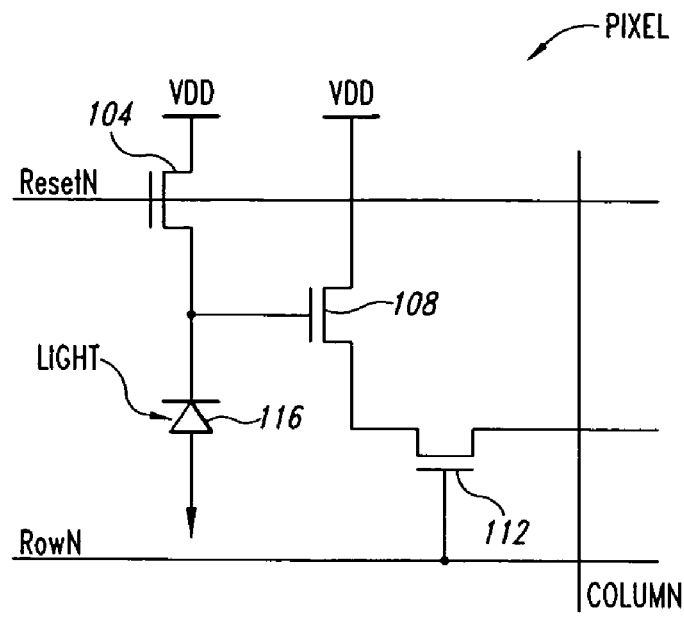
FIG. 1 is a schematic of a portion of a conventional CMOS APS.
Figure 2:
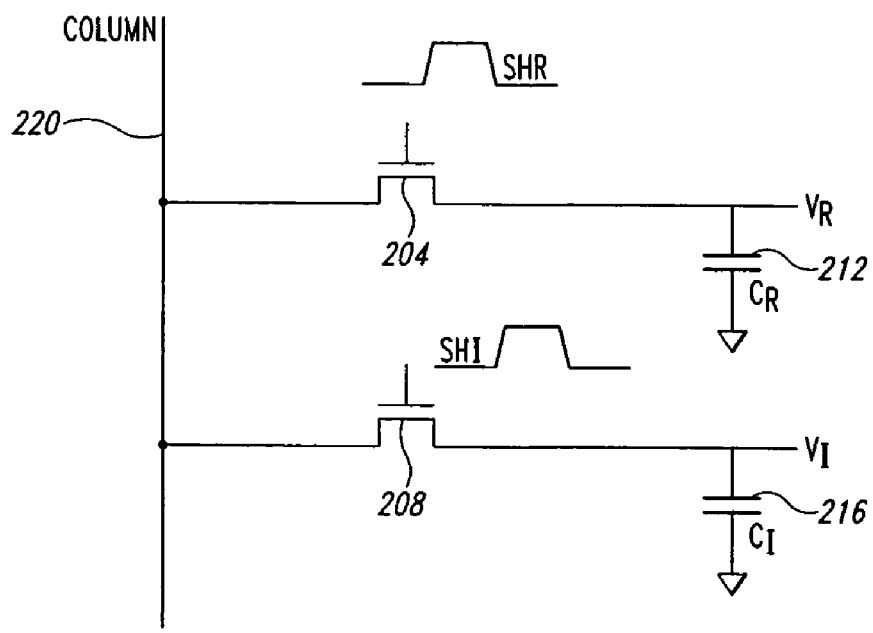
FIG. 2 illustrates a sample and hold circuit to sample reference and intensity voltages.
Figure 3:
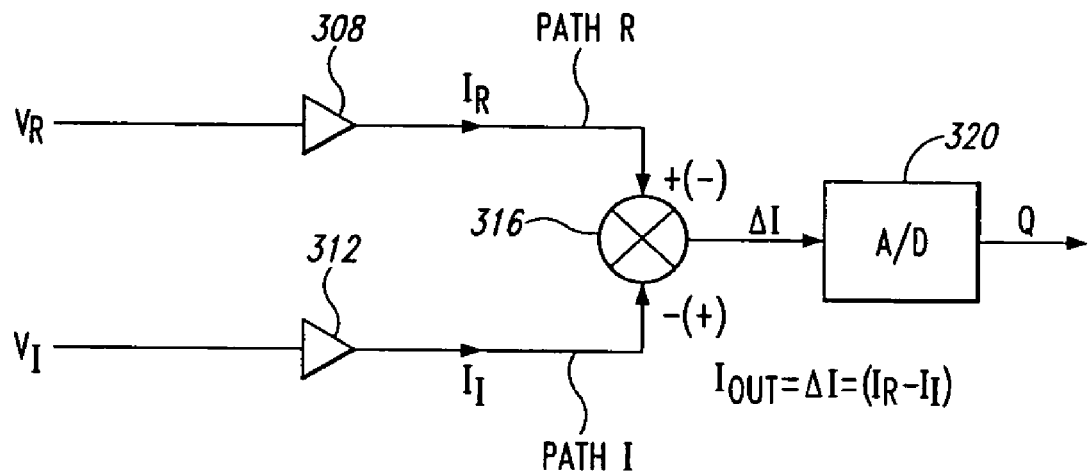
FIG. 3 is a schematic for generating a digital output representative of a difference between the reference and intensity voltages.
Figure 4:
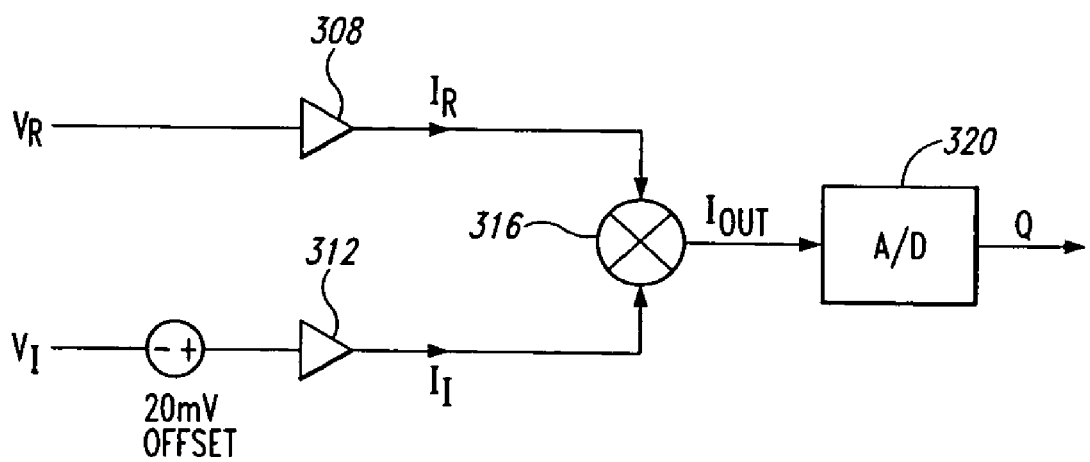
FIG. 4 illustrates a mismatch between the reference path and the intensity path.
Figure 5:
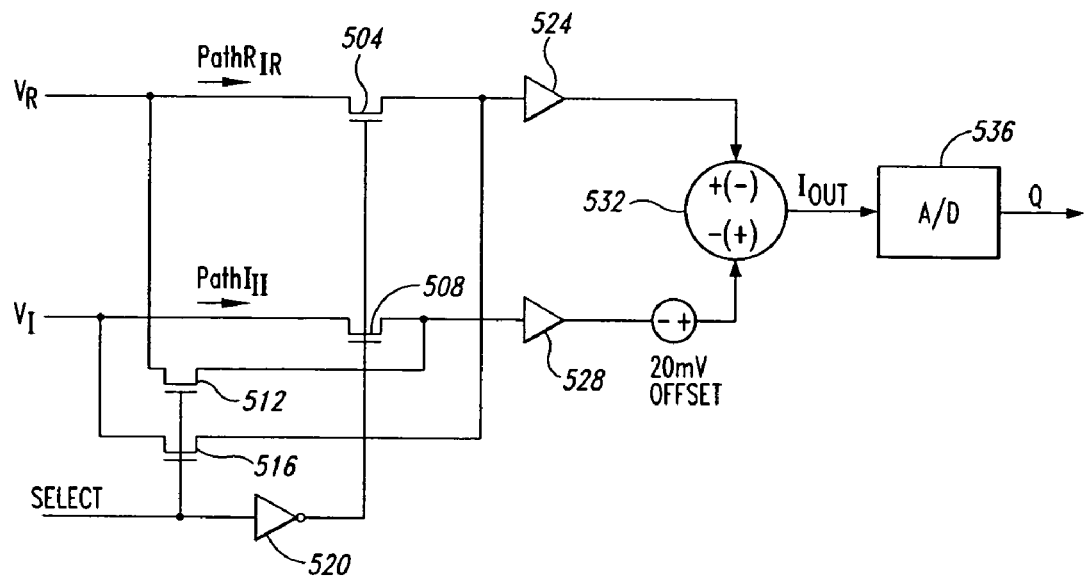
FIG. 5 illustrates a circuit for reducing the mismatch according to one embodiment of invention.
Figure 6:
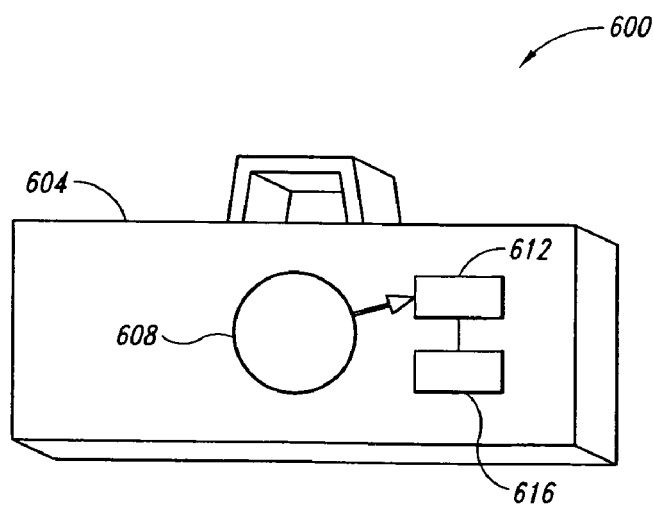
FIG. 6 shows a digital camera including a circuit for reducing the mismatch.

FIG. 5 illustrates a circuit according to one embodiment of the invention in which the inputs to an A/D converter are switched halfway through the A/D conversion to eliminate mismatch. The circuit comprises transistors 504, 508, 512, 516 and a toggle switch 520. The circuit couples the reference voltage $V_R$ and the intensity voltage $V_I$ to an A/D converter 536. A current to voltage converter 524 is in series with path R, and a current to voltage converter 528 is in series with path I. A 20 mV offset is in series with path I. The 20 mV offset represents a mismatch between the path I and path S. As discussed earlier, the 20 mV offset is caused by a varying transconductance and random offset associated with path R and path I. A differential circuit 532 is coupled to paths R and I. The differential circuit 532 receives the currents $I_R$ and $I_I$ and generates and output $I_{OUT}$, where $I_{OUT}=I_R-I_I$. The polarity of the 20 mV offset with respect to the differential circuit 532 can be reversed during the operation of the circuit.

Consider, for example, an A/D conversion that occurs over a period of 20 us. During the first 10 μs, the select signal is low, which turns transistors 504 and 508 on and transistors 512 and 516 off. Thus path R applies the current $I_R$ to the differential circuit 532 and path I applies the current $I_I$ the differential circuit 532.

During the next 10 μs, the select signal is driven high, which turns the transistors 504 and 508 off and turns the transistors 512 and 516 on, thereby switching the inputs to the differential circuit 532. During this time, path I applies the current $I_R$ to the differential circuit 532, and path R applies the current $I_I$ to the differential circuit 532.

During the first 10 μs, the 20 mV offset is connected in series with path I. During the next 10 μs, the 20 mV offset is connected in series with path R but with polarity of the 20 mV offset reversed with respect to the differential circuit 532.

By switching the inputs to the differential circuit 532 halfway through the A/D conversion, each signal is subject to the same amount of offset and gain during the total conversion period. Thus, the mismatch due to the difference in the paths are eliminated.

FIG. 8 illustrates a digital camera 600 that utilizes a circuit in accordance with one embodiment of the invention. The digital camera 600 includes a lens 608, a CMOS APS 612 and a circuit 616 encased in a camera body 604. The CMOS APS 612 receives light through the lens 608 and generates a column voltage that is applied to the circuit 616. The circuit 616 reduces the mismatch between a reference path and an intensity path as discussed above.

It is to be understood that even though various embodiments and advantages of the present invention have been set forth in the foregoing description, the above disclosure is illustrative only, and changes may be made in detail, and yet remain within the broad principles of the invention. For example, many of the components described above may be implemented using either digital or analog circuitry, or a combination of both, and also, where appropriate, may be realized through software executing on suitable processing circuitry. Therefore, the present invention is to be limited only by the appended claims.

The invention claimed is:

1. An circuit for coupling signals to a processing unit in an image sensor comprising:

a first switch configured to couple a first input node to a first output node and a second switch configured to couple a second input node to a second output node, the first and second switches operable during a first operating period to respectively apply a reference signal received by the first input node to the first output node and a intensity signal received by the second input node to the second output node;

a third switch configured to coupled the first input node to the second output node and a fourth switch configured to couple the second input node to the first output node, the third and fourth switches operable during a second operating period to respectively apply the reference signal received by the first input node to the second output node and the intensity signal received by the second input node to the first output node; and a differential circuit coupled to the first and second output nodes, the differential circuit configured to receive the respective applied signals from the first and second output nodes during the first and second operating periods, the differential circuit operable to generate an output signal that represents the difference between the reference signal and the intensity signal in a manner that causes the applied signals received during the second operating period to counteract any offset in the applied signals received during the first operating period.

2. The circuit of claim 1 further comprising a select circuit coupled to the first, second, third and fourth switches, the select circuit configured to receive a select signal and operable responsive to the select signal to enable the first and second switches during the first operating period and to enable the third and fourth switches during the second operating period.

3. The circuit of claim 1 wherein the reference signal comprises a reference voltage from a reference voltage source, and the intensity signal comprises an intensity voltage from a light detection source.

4. The circuit of claim 1 further comprising a first voltage-to-current converter coupled to the first output node and a second voltage-to-current converter coupled to the second output node, the first and second voltage-to-current converters operable to convert the respectively received reference and intensity signals to a reference current and an intensity current, and supply the reference current and the intensity current to the respective first and second output nodes accordingly.

5. The circuit of claim 4 wherein the differential circuit comprises a current mirror coupled to the first and second output nodes, the current mirror operable to receive the reference current and the intensity current to generate an output current representative of the difference between the reference current and the intensity current.

6. The circuit of claim 5 further comprising an A/D converter circuit configured to receive the output current and operable to generate a digital output representative of the difference between the reference signal and the intensity signal.

7. The circuit of claim 1 wherein the differential circuit further comprises receiving the signals from the first and second output nodes at a first polarity during the first operating period, and receiving the signals from the first and second output nodes at a reverse polarity during the second operating period.

8. An image sensor having a reference node to which a reference voltage is applied and an input node to which an input voltage is applied, the image sensor comprising:
    a first signal pathway configured to couple the reference node to a first output node during a first operating period and the reference node to a second output node during a second operating period, the first signal pathway operable to generate an output signal corresponding to the received voltage at the reference node or the input node;
    a second signal pathway configured to couple the input node to the second output node during the first operating period and the input node to the first output node during the second operating period, the second signal pathway operable to generate an output signal corresponding to the received voltage at the reference node or the input node; and
    a differential circuit coupled to receive the respective output signals at the first and second output nodes, the differential circuit operable to generate a difference signal that represents the difference between the reference voltage and the input voltage in a manner that causes the received output signals during the second operating period to counteract any offset in the received output signals during the first operating period.

9. The image sensor of claim 8 wherein the first signal pathway comprises a first transistor configured to couple the reference node to the first output node during the first operating period and a second transistor configured to couple the reference node to the second output node during the second operating period, and wherein the second signal pathway comprises a third transistor configured to couple the input node to the second output node during the first operating period and a fourth transistor configured to couple the input node to the first output node during the second operating period.

10. The image sensor of claim 9 further comprising a select circuit coupled to the first, second, third and fourth transistors, the select circuit configured to receive a select signal and operable responsive to the select signal to enable the first and third transistors during the first operating period and to enable the second and fourth transistors during the second operating period.

11. The image sensor of claim 8 wherein the reference voltage comprises a voltage from a reference voltage source, and the input voltage comprises a voltage from a light detection source.

12. The image sensor of claim 8 further comprising a first voltage-to-current converter coupled to the first output node and a second voltage-to-current converter coupled to the second output node, the first and second voltage-to-current converters operable to convert the respectively received reference and input voltages to a reference current and an input current, and supply the reference current and the input current to the first and second output nodes accordingly.

13. The image sensor of claim 12 wherein the differential circuit comprises a current mirror coupled to the first and second output nodes, the current mirror operable to receive the reference current and the input current to generate an output current representative of the difference between the reference current and the input current.

14. The image sensor of claim 13 further comprising an A/D converter circuit configured to receive the output current and operable to generate a digital output representative of the difference between the reference voltage and the input voltage.

15. The image sensor of claim 8 wherein the differential circuit further comprises receiving the output signals from the first and second output nodes at a first polarity during the first operating period, and receiving the output signals from the first and second output nodes at a reverse polarity during the second operating period.

16. A digital camera comprising:
    a CMOS active pixel sensor circuit containing a plurality of pixels connected to a column line, each pixel containing a photo sensing diode and at least one transistor, the photo sensing diode operable to generate an intensity voltage on the column line when light is incident on the pixel and to generate a reference voltage when light is not incident on the pixel; and
    a circuit for coupling the intensity and reference voltages to a processing circuit, comprising:
    a first switch configured to couple a first input node to a first output node and a second switch configured to couple a second input node to a second output node, the first and second switches operable during a first operating period to respectively apply the reference voltage received by the first input node to the first output node and the intensity voltage received by the second input node to the second output node;
    a third switch configured to coupled the first input node to the second output node and a fourth switch configured to couple the second input node to the first output node, the third and fourth switches operable during a second operating period to respectively apply the reference voltage received by the first input node to the second output node and the intensity voltage received by the second input node to the first output node; and a differential circuit coupled to the first and second output nodes, the differential circuit configured to receive the respective applied signals from the first and second output nodes during the first and second operating periods, the differential circuit operable to generate an output signal that represents the difference between the reference voltage and the intensity voltage in a manner that causes the applied signals received during the second operating period to counteract any offset in the applied signals received during the first operating period.

17. The digital camera of claim 16 further comprising a select circuit coupled to the first, second, third and fourth switches, the select circuit configured to receive a select signal and operable responsive to the select signal to enable the first and second switches during the first operating period and to enable the third and fourth switches during the second operating period.

18. The digital camera of claim 16 further comprising a first voltage-to-current converter coupled to the first output node and a second voltage-to-current converter coupled to the second output node, the first and second voltage-to-current converters operable to convert the respectively received reference and intensity voltages to a reference current and an intensity current, and supply the reference current and the intensity current to the respective first and second output nodes accordingly.

19. The digital camera of claim 18 wherein the differential circuit comprises a current mirror coupled to the first and second output nodes, the current mirror operable to receive the reference current and the intensity current to generate an output current representative of the difference between the reference current and the intensity current.

20. The digital camera of claim 19 further comprising an A/D converter circuit configured to receive the output current and operable to generate a digital output representative of the difference between the reference voltage and the intensity voltage.

21. The digital camera of claim 16 wherein the differential circuit further comprises receiving the signals from the first and second output nodes at a first polarity during the first operating period, and receiving the signals from the first and second output nodes at a reverse polarity during the second operating period.

22. A method for coupling an intensity voltage and a reference voltage to a processing unit in an image sensor, the method comprising:

applying the reference voltage to a first output node and the intensity voltage to a second output node during a first operating period;

applying the reference voltage to the second output node and the intensity voltage to the first output node during a second operating period; and generating an output signal that represents the difference between the reference voltage and the intensity voltage in a manner that causes the applied voltages received during the second operating period to counteract any offset in the applied voltages received during the first operating period.

23. The method of claim 22 further comprising receiving a select signal to enable the first operating period or the second operating period.

24. The method of claim 22 further comprising converting the applied reference voltage to a reference current and the applied intensity voltage to an intensity current.

25. The method of claim 24 wherein generating the output signal comprises generating an output current representative of the differences between the reference current and the intensity current.

26. The method of claim 25 further comprising receiving the output current, and generating a digital output signal representative of the difference between the reference signal and the intensity signal.

27. The method of claim 22 wherein generating the output signal comprises receiving the signals from the first and second output nodes at a first polarity during the first operating period, and receiving the signals from the first and second output nodes at a reverse polarity during the second operating period.

28. A method for reducing a mismatch between a first signal pathway and a second signal pathway coupling a CMOS active pixel sensor to a processing circuit, the method comprising:

applying a first signal to the first signal pathway;

applying a second signal to the second signal pathway;

toggling the applied first signal from the first signal pathway to the second signal pathway responsive to a select signal;

toggling the applied second signal from the second signal pathway to the first signal pathway responsive to the select signal; and reversing the polarity of the toggled first and second signals in a manner that causes the toggled first and second signals responsive to receiving the select signal to counteract any offset in the applied first and second signals before receiving the select signal.

29. The method of claim 28 further comprising converting the applied first signal to a reference current and the applied second signal to an intensity current.

30. The method of claim 28 further comprising generating an output signal representative of the differences between the applied first signal and the applied second signal.

31. The method of claim 30 further comprising receiving the output signal, and generating a digital output signal representative of the difference between the applied first signal and the applied second signal.

* * * * *